(12) United States Patent
Ankur (10) Patent No.: US 12,322,395 B2
(45) Date of Patent: Jun. 3, 2025

(54) METHODS AND SYSTEMS FOR PROPAGATING A STOPPING CONDITION IN A DISTRIBUTED MULTIPLE-PRODUCER, MULTIPLE-CONSUMER SYSTEM

(71) Applicant: Capital One Services, LLC, McLean, VA (US)

(72) Inventor: Ankur Ankur, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 304 days.

(21) Appl. No.: 17/819,923

(22) Filed: Aug. 15, 2022

(65) Prior Publication Data

US 2024/0055004 A1  Feb. 15, 2024

(51) Int. Cl.
*G10L 15/26* (2006.01)
*G06F 40/295* (2020.01)
*G10L 15/30* (2013.01)

(52) U.S. Cl.
CPC ............ *G10L 15/30* (2013.01); *G06F 40/295* (2020.01); *G10L 15/26* (2013.01)

(58) Field of Classification Search
CPC ......... G10L 15/26; G10L 15/00; G10L 15/06; G10L 15/08; G10L 15/20; G10L 15/285; G10L 15/30; G10L 15/32; G06F 40/00; G06F 40/12; G06F 40/16; G06F 40/20; G06F 40/205; G06F 40/226; G06F 40/279; G06F 40/295; G06F 40/35
USPC ........ 704/231, 235, 237, 243, 257, 272, 1, 9
See application file for complete search history.

(56) References Cited

U.S. PATENT DOCUMENTS

| | | | |
|---|---|---|---|
| 11,810,345 B1* | 11/2023 | Gayaka | G06V 40/161 |
| 2003/0188300 A1* | 10/2003 | Patrudu | G06F 9/547 |
| | | | 717/149 |
| 2006/0271205 A1* | 11/2006 | Abe | G06F 11/0715 |
| | | | 700/9 |
| 2015/0135183 A1* | 5/2015 | Kipp | G06F 9/5038 |
| | | | 718/103 |
| 2019/0303143 A1* | 10/2019 | Beard | G06F 9/3836 |

* cited by examiner

*Primary Examiner* — Qi Han
(74) *Attorney, Agent, or Firm* — Foley & Lardner LLP (57) ABSTRACT

Methods and systems for propagating a stopping condition through a multiple-producer, multiple-consumer distributed system. The method includes determining the number of active processes in a process layer, determining that a stopping condition is satisfied, generating a sentinel in a source queue, receiving a processing task at a process, determining whether the processing task is a sentinel, terminating the first process, decrementing the number of active processes by one, and generating the sentinel in a destination queue.

20 Claims, 4 Drawing Sheets

METHODS AND SYSTEMS FOR PROPAGATING A STOPPING CONDITION IN A DISTRIBUTED MULTIPLE-PRODUCER, MULTIPLE-CONSUMER SYSTEM

BACKGROUND

As the existence and availability of data expands exponentially, finding ways to process this data is playing a more central role in improving the energy efficiency and efficacy of information processing systems. As the complexity of these systems increases, finding improvements to system resource management is crucial to balancing the need for processing speed or throughput with sufficient control of the process as a whole. In processing systems with multiple producers and consumers distributed across multiple devices, for example, named-entity recognition systems, a challenge is how to communicate global conditions to individual components of the system. For example, it is not trivial to communicate an instruction to terminate processes across the entire system, all while operating without the existence of a central storehouse of information, or a global state. This is particularly true in speech-to-text processing in a named-entity recognition engine, where the inputted data is provided in a continuous stream of data and in which the data requires serial processing through multiple processing layers.

SUMMARY

Systems and methods are described herein for novel uses and/or improvements to distributed data processing systems. As one example, methods and systems are described herein to allow a speech-to-text processing in a named-entity recognition engine to ensure that all processes finish the execution of their current tasks before entering an idle state, which allows for improved management of system resources, energy usage, and more efficient writing of results. For example, the speech-to-text processing in a named-entity recognition engine may ensure that all text in a current sentence is processed prior to text in the next sentence. As such, the context of each sentence and its relationship to other sentences may be maintained.

For example, conventional speech-to-text processing works through engines that can produce objects, or tasks, that are queued up and consumed, or processed in order. By decoupling the detection of work from the execution of work, a typical engine allows for precise control over resources that are devoted to either producing or processing tasks. Additionally, there may be multiple processing layers comprising engine subsystems, which can be decentralized as well. Distinct compute nodes, for example, may be employed for producing work, queuing it up, and processing the work in each of these subsystems. However, because these engines are distributed across multiple devices, in some cases by design, there is a lack of a global storehouse of information about active producers and processes in each layer of the system, which makes simultaneously notifying processes of a global stopping condition, for example, a notification of a lack of future work, intractable.

Systems and methods are described herein for overcoming this technical problem by utilizing a sentinel symbol that is allowed to propagate through processing layers according to rules that account for the processes in each layer that are active or inactive. For example, a layer-wise state tracking system, in some cases, can hold information about how many active workers exist in a layer in a way that allows for a decision as to whether to continue to propagate the sentinel to subsequent layers based on the number of these active workers. By creating a rule-based system to propagate the stopping condition into multiple layers using a sentinel, global information regarding whether there is further work to be done may permeate through the system in a way that allows for workers to finish the execution of their current tasks before entering the idle state. This method may be carried out in a way that does not require a global storehouse of information about the whole system, which leverages the strengths of a distributed producer-consumer system. Propagating this stopping condition through the sentinel then allows for the improved management of system resources, energy usage, and more efficient writing of results of any processes, by enabling the communication of the stopping condition to individual processes precisely when they are ready to be terminated, even if these processes must individually terminate at different times.

In some aspects, systems and methods are designed to first determine a first number of active processes in a first process layer, wherein the first process layer comprises a first plurality of processes. The system may determine that a first stopping condition is satisfied in a first source queue of a first plurality of processing tasks for a first device in a computer network, wherein the first source queue provides the first plurality of processing tasks to the first process layer for the first device. In response to determining that the first stopping condition is satisfied, the system may generate a first sentinel in the first source queue. At a first process of the first plurality of processes, the system may receive a first processing task of the first plurality of processing tasks from the first source queue. The system may determine whether the first processing task comprises the first sentinel. In response to determining that the first processing task comprises the first sentinel, the system may terminate the first process and decrement the first number of active processes by one. In response to determining that the first number of active processes in the first process layer is zero, the system may generate a first sentinel in a first destination queue.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details, or with an equivalent arrangement. In other cases, well-known structures and devices are shown in block diagram form in order to avoid unnecessarily obscuring the embodiments of the invention.

Figure 1:
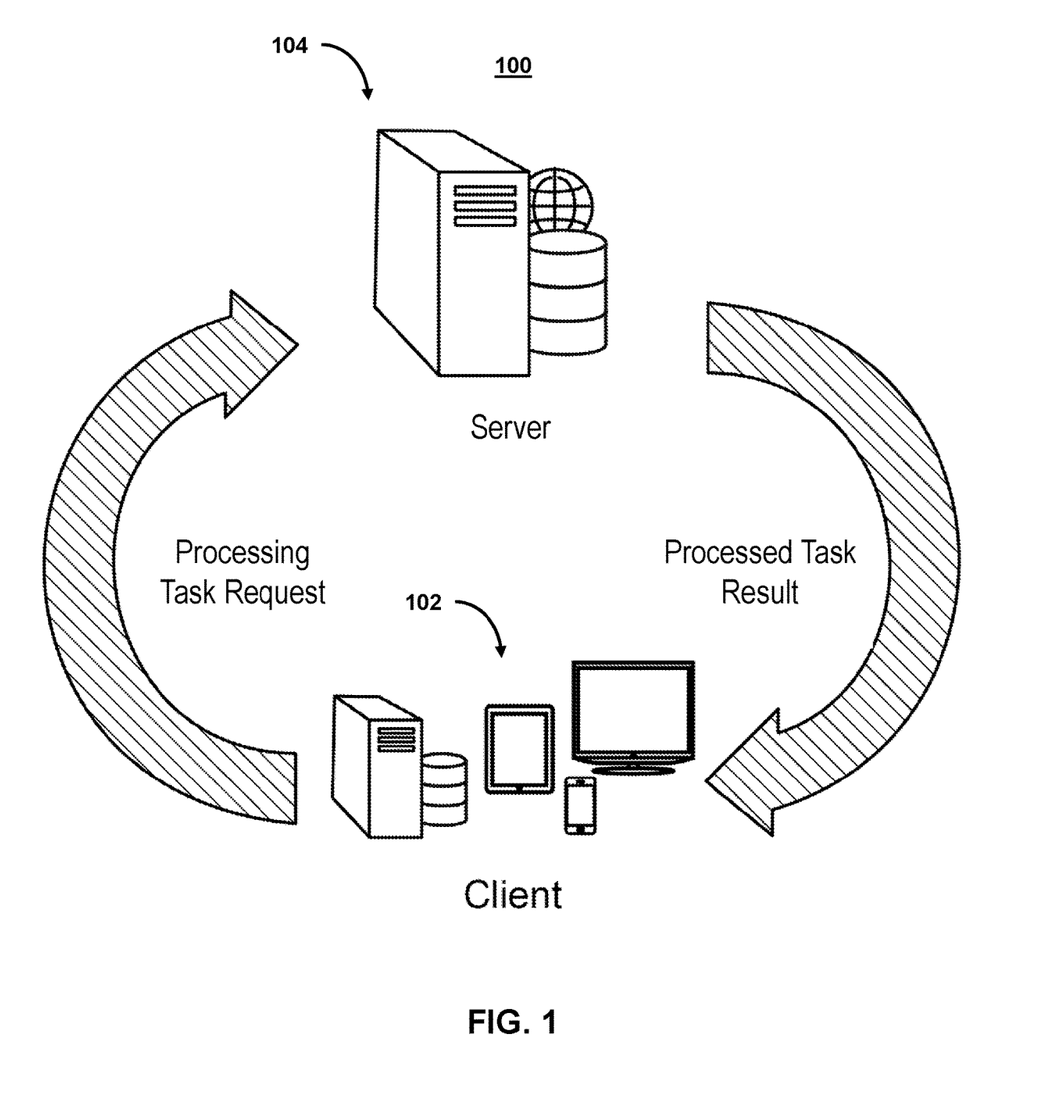
FIG. 1 shows an illustrative system environment for making processing requests and receiving processed results, in accordance with one or more embodiments.

FIG. 1 shows an illustrative system environment for the exchange of change requests, responses and analysis within a computer network, in accordance with one or more embodiments. For example, as shown in FIG. 1, client devices 102 may issue processing task requests to server 104. In response, server 104 may process tasks and return a processed task result in response. Client devices 102 and server 104 may operate in a client-server model in which a distributed application structure partitions tasks or workloads between the providers of a resource or service, called servers, and service requesters, called clients. In some embodiments, server 104 may comprise an analytics engine. In some embodiments, server 104 may comprise a plurality of subsystems, wherein each subsystem may comprise devices, computers or servers that contain source queues, processing layers, processes, destination queues or other data structures, such as processing tasks. Client device 102 may issue processing task requests to server 104, and may comprise a plurality of subsystems making such requests to or accepting results from server 104. By doing so, the system may operate as a distributed multiple-producer, multiple-consumer system. In this manner, the system, and, in particular, client device 102 and server 104, may distribute tasks or functions across various devices to optimize system resource use and, as a result, efficiency. The distributed multiple-producer, multiple-consumer system shown in FIG. 1 may also contain a sentinel placed in server 104 by client device 102, which may be a symbol that signals to the system to begin winding down processes. Being a distributed system, the sentinel may be propagated through the various components of the system in order to send instructions to processes to terminate in turn. This propagation may be informed and controlled by a state tracking system that locally tracks the processes in the system that are active, which allows for a decision to be made on when the sentinel may continue to be propagated through server 104. The sentinel and state tracking systems may help ensure that all processes finish the execution of their required tasks before entering an idle state; tracking this process allows for improved management of system resources, energy usage and more efficient writing of results by allowing processes to terminate in a more controlled, predictable way.

The system may be used, for example, in named-entity recognition systems that operate on, for example, call-center audio transcripts, which may be stored on cloud storage, which may be accessible to client device 102. Upon a request from client device 102, a producer on server 104 may read the audio transcript cloud storage paths and place them on a source queue. Multiple speech-to-text systems may then pull transcript paths from the queue, apply a speech-to-text model, and produce transcribed text to a destination queue, which may further be processed by named-entity processes in subsequent queues; server 104 may house multiple subsystems that may variously implement these steps in a distributed manner.

As referred to herein, "computer network" may comprise two or more devices that are connected to one another for the purpose of communicating data electronically, such as numerical values, temporal indicators, alphanumeric information, signals, audio transcripts, or any other type of data. Devices may include any unit of physical hardware or equipment that provides one or more computing functions within a computer network. Devices may provide input to the network, accept output, or both. A device can be any electronic element with some computing ability that supports the installation of firmware or third-party software. Devices may, for example, include smartphones, computers, tablets or smartwatches, or any other element that may provide input or accept output to the network. Devices may exhibit a user interface.

As referred to herein, "distributed system" may comprise a system that is comprised of multiple clients or nodes that communicate with servers or machines throughout a computer network. In this architecture, information processing is not confined to a single device; rather, it is distributed over several independent devices. For example, a client-server model that allows for a multi-tier architecture enables and manages communication between the functions of the computer network regardless of their network location. For example, different components of the distributed application may reside on various devices.

As referred to herein, a "multiple-producer multiple-consumer system" may comprise a concurrency design pattern where multiple tasks, known as producers, produce objects which are queued up, in some embodiments in a source queue, and then consumed by multiple processes known as consumers. The queued objects may comprise tasks that must be carried out. By decoupling the detection of tasks from the execution of tasks, the system may control the number of processes that are involved in detecting or executing the tasks, leading to improved control over system resources. A "distributed multiple-producer multiple-consumer system" may involve such a system that may have multiple components, as in a distributed system, that carry out this detection and execution of tasks. Sending a request to process a task, or a "processing task request," as referred to herein, may comprise a request by a producer to add a task to a source queue to wait for a consumer, which may be a process, to execute the task. The producer and consumers may be processes, threads or some other task execution mechanism, which can be scheduled for execution on one or more nodes in a distributed system.

As referred to herein, "analytics engine" may comprise any device or network that allows for analytics to be performed on the computer network. Analytics may include any information resulting from the systematic analysis of data or statistics. For example, an analytics engine may utilize artificial neural networks to identify patterns and predict performance outcomes based on data collected from the network. An analytics engine may be housed on one device, or may be distributed amongst multiple devices. An analytics engine may correspond to one or more parts of a multiple-producer, multiple-consumer system, or may correspond to the full system. For example, a task that the producer queues into a source queue may then be executed by an analytics engine, which acts as a consumer in this case, in order to produce a result. In some embodiments, this analytics engine may be a speech-to-text analyzer.

As referred to herein, "speech-to-text analyzer" may comprise a system that enables the recognition and/or translation of spoken language into text. For example, a speech-to-text analyzer may accept the location of an audio file as input and produce text data corresponding to any words spoken in the audio file as an output. In some embodiments, dynamic time warping, hidden Markov models, machine learning, deep learning or artificial neural networks may be used to process audio data and produce the text data, and in some embodiments, the analyzer may also be able to identify the speaker in the audio file.

As referred to herein, "named-entity recognition" may comprise information extraction that seeks to locate and classify named entities mentioned in unstructured text into predefined categories such as person names, organizations or time expressions. Some named-entity recognition system platforms may include GATE, OpenNLP or SpaCy. Machine learning, statistical models and grammar-based techniques may inform the development of named-entity recognition models. Applications may include classifying callers at call centers for customer information, service feedback or other commercial reasons.

As referred to herein, "system resource use" may comprise the use of any technical features of the system that may be scarce or costly to run. For example, memory usage may comprise system resource use, where processes, tasks or queues may share memory allocations. Power consumption may also comprise system resource use, as well as system throughput, as bandwidths may limit throughput.

As referred to herein, a "user interface" may comprise a human-computer interaction and communication in a device, and may include display screens, keyboards, a mouse, and the appearance of a desktop. For example, a user interface may comprise a way a user interacts with an application or a website.

Figure 2:
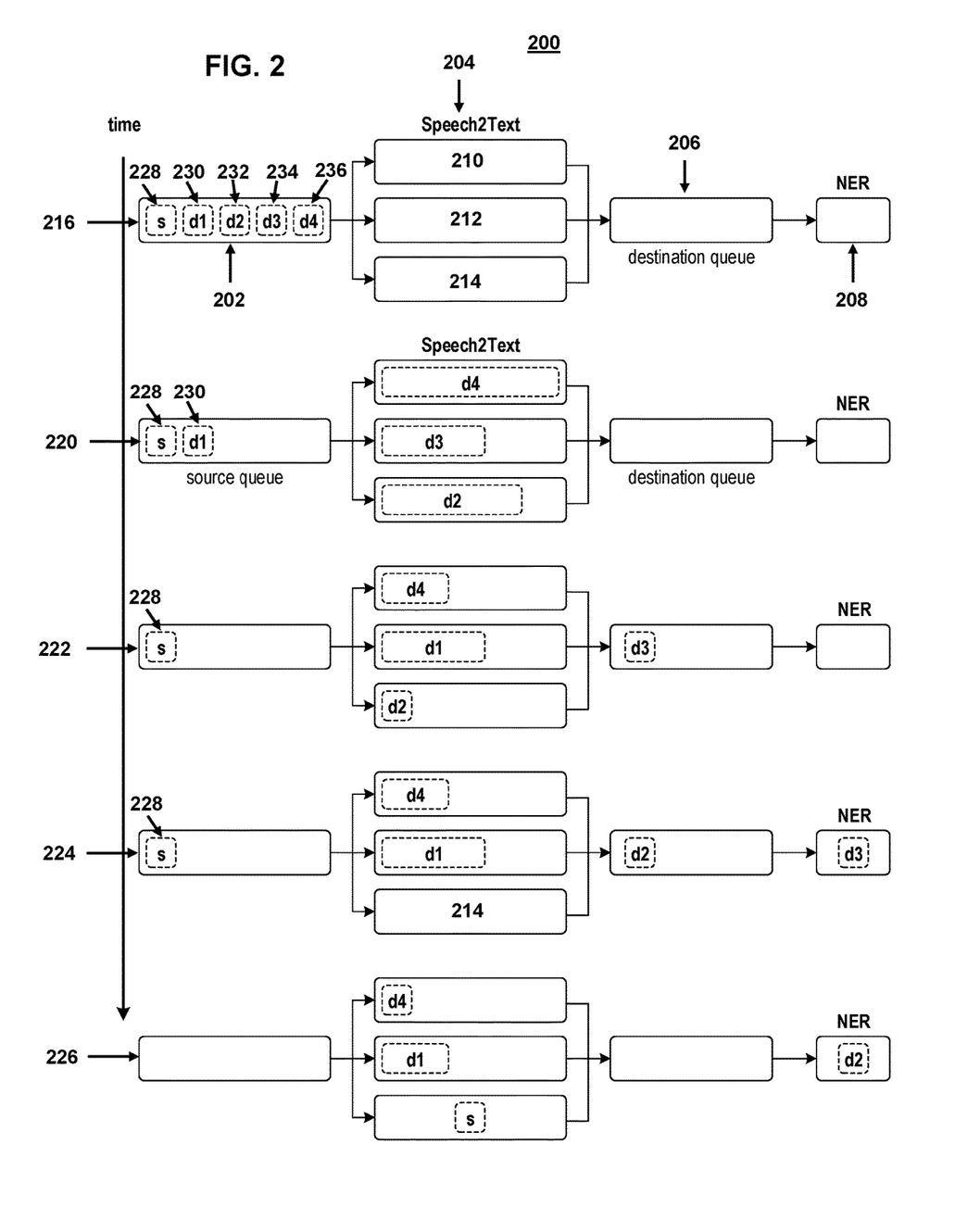
FIG. 2 shows an illustrative system environment for processing and propagating tasks, in accordance with one or more embodiments.

FIG. 2 shows an illustrative system environment for processing and propagating tasks, in accordance with one or more embodiments. Flow 216 depicts a starting state for the system environment. The system may comprise a source queue 202, which may be accessible to a process layer 204, which in turn may communicate with a destination queue 206. Further processing may occur in subsequent stages 208 of the system, which may include, in the case of a language processing program, a named-entity recognition system. Process layer 204 may comprise multiple processes 210-214. The system works in order to process a plurality of processing tasks 228-236, which are placed in source queue 202. In some embodiments, a source may generate these processing tasks in source queue 202 from processing requests. In some embodiments, a destination queue may act as a source for another queue and processing layer in subsequent stages 208. When a first stopping condition is satisfied, a sentinel 228 may be placed in source queue 202, wherein sentinel 228 may comprise one processing task of plurality of processing tasks 228-236. Processes 210-214 in process layer 204 may subsequently process tasks 228-236, as shown in flow 220. For example, as a process, such as process 212, finishes its particular processing task 234, which may occur at different times for different processes, in some embodiments, process 212 may place the processed result into destination queue 206. If additional tasks are pending in source queue 202, such as task 230 shown in flow 220, process 212 may receive this for processing. Once any pending processing tasks (e.g., processing tasks 230-236) have been processed, only sentinel 228 remains, as shown for illustrative purposes in flow 222. Any processes that are free to receive the sentinel, for example, process 214 in flow 224, may receive the sentinel, which signals that they may begin to shut down, as shown in flow 226. In some embodiments, the sentinel is replaced in source queue 202, such that other processes 210 and 212 may also receive the sentinel and shut down in response. Process layer 204 may comprise a number of active processes and, in some embodiments, a state tracking system. When all processes 210-214 in process layer 204 shut down, the number of active processes drops to 0, which may signal to process layer 204 to pass along sentinel 228 to destination queue 206, completing one cycle of the propagation of the stopping condition onwards. By using a rule-based approach to propagating sentinel 228, processes may, in turn, receive a signal to stop without the use of a central, system-wide information storehouse; rather the system leverages a state tracking system that is local to, for example, process layer 204, allowing processes, queues and tasks to be decentralized and distributed across various devices or subsystems. Thus, utilizing a system that propagates a sentinel 228 enables a distributed, multiple-producer, multiple-consumer system, while crucially also allowing tasks to receive notification about when to begin winding down, terminating, cleaning up or recording results, for example. As subsequent stages 208 may include further processing layers, the system is generalizable to larger-scale producer-consumer systems, which may be distributed across additional devices or nodes. By doing so, the system ensures that all workers finish execution of their tasks before entering an idle state, which can improve management and control of system resources, energy usage and the writing of any results of processes.

The system may use a source queue. As referred to herein, a "source queue" may comprise a data structure in which tasks, jobs, work, data or information that needs to be processed, known as "processing tasks," may be held. In some embodiments, the source queue may comprise a set of audio file paths to be processed in a speech-to-text analyzer. In some embodiments, the audio files may arise from call-center data. For example, a source queue may be a vector or a list in order of when the processing task is entered into the queue. In some embodiments, a "source" may provide links or paths to files that need processing. By providing a source queue where pending tasks may be stored, the system may ensure that all tasks are handled in the order that they are received, even if processes are busy or unavailable to receive the tasks concurrently. When the source queue is full, any producer may be blocked from writing to the queue, signaling a limit on tasks that processes may accept. When the source queue is empty, any consumer may be blocked from reading out of it. Processing tasks may include any computing tasks that must be processed or executed; for example, a processing task may include instructions to execute a speech-to-text analyzer to transcribe audio files. Processing tasks may require different lengths of processing time. For example, a longer audio file may require a longer speech-to-text conversion process than a shorter audio file. By controlling and organizing the flow of tasks into the system, a source queue allows a system with multiple producers, or sources, and multiple consumers, or processes, to manage tasks in a way that allows maximization and efficiency in the use of resources.

As referred to herein, a "source" may comprise any producer of processing task requests or any task execution request. For example, a source may comprise a separate device, such as client device 102 from FIG. 1, wherein the separate device may interface with cloud storage in order to provide links or paths to objects or files that need processing. By allowing the source to interface with a source queue, the system may independently determine, or produce, tasks that may be executed in a manner that does not require a global storehouse of information, conferring upon the system more flexibility, modularity and allowing processes to act more efficiently.

The system may comprise processes. As referred to herein, a "process" may comprise an instance of a computer program, thread or some other task execution mechanism, which, in some embodiments, may be scheduled for execution on one or more compute nodes in a distributed cluster and, in some embodiments, may reside within a process layer, for example, processes 210-214 in process layer 204. For example, in some embodiments, a process may comprise a speech-to-text process, wherein the speech-to-text process may be used to process call-center audio transcripts. This process may comprise downloading a transcript from cloud storage, applying a speech-to-text model, producing the transcribed text, and placing the output in a destination queue. This process may require different elapsed times depending on the nature (e.g., length or size) of the corresponding incoming processing tasks. In a distributed multiple-producer, multiple-consumer system, a process may comprise a consumer of tasks, and may in turn act as a producer for a subsequent process layer. In some embodiments, a process may also react to a sentinel by processing it differently; a process may begin to terminate in response to receiving a sentinel from the source queue and may also decrement a number of active processes. Additionally, or alternatively, a process may alert a state tracking system of the receipt of a sentinel and a decision to terminate. In some embodiments, a process may utilize system resources, such as power or memory, and may require additional clean-up tasks or processes prior to termination. By structuring these processes in an independent fashion, by allowing processes to interact with a source queue and carry out tasks, the system leverages modularity and allows for processes to synchronously or asynchronously operate in a manner that improves system reliability and control over system resources.

The system may comprise process layers. As referred to herein, a "process layer" may comprise a structure that may contain multiple processes that are capable of executing tasks. A process layer may comprise multiple tasks that may operate on similar tasks simultaneously, and may comprise multiple threads of the same type of process. All processes within a process layer may interact with the same source queue or the same destination queue. For example, a process layer may comprise a plurality of speech-to-text analyzers, which may, through processes therein, analyze call-center audio transcripts in parallel. By including a process layer, the system may divide, control or redistribute system resources depending on which processes are active. Processes may also be terminated independently within a process layer, allowing for required processes to continue and terminated processes to remain dormant. The process layer allows for specialized control of the individual processes therein.

The system may comprise a destination queue. As referred to herein, a "destination queue" may comprise a data structure in which processed tasks, jobs, work, data or information may be placed. In some embodiments, the destination queue may comprise a set of audio transcripts processed in a speech-to-text analyzer. In some embodiments, the audio transcripts may have arisen from call-center data. For example, a destination queue may be a vector or a list with the results of processing tasks. By providing a destination queue where processed tasks may be stored, the system may ensure that all results are handled in the order that they are produced, even if processes provide results differently; results may then be further processed in order. When the destination queue is full, any process may be blocked from writing to the queue. When the destination queue is empty, any consumer may be blocked from reading out of it. By controlling and organizing the flow of tasks out of the system, a destination queue allows a system with multiple producers, or sources, and multiple consumers, or processes, to manage tasks in a way that allows maximization and efficiency in the use of resources.

The system may comprise a stopping condition. As referred to herein, a "stopping condition" may comprise any signal or instruction for the system to begin terminating. Terminating may, for instance, comprise setting the system to an idle state, or shutting it off completely. In some embodiments, a stopping condition may be triggered by a lack of processing task requests, for example, or may be an instruction to turn off the system for maintenance. A stopping condition may be a global signal; however, a source queue may make use of a sentinel to communicate a stopping condition to the various components of the system. Establishing that there are no more tasks to complete is important for each part of the system, so that components, such as the source queue, the processes, the destination queue and any other process layers may begin to launch exit or clean-up tasks, write results to an exit store, or release any system resources.

The system may comprise a sentinel. As referred to herein, a "sentinel" may comprise a marker, a symbol or an instruction that may be mobile through various components in the system. In some embodiments, the system may generate the sentinel in response to a stopping condition. As processes in the process layer begin to encounter a sentinel, they may begin to execute any tasks that are needed for termination, returning to an idle state, or deactivation. In some embodiments, a process notifies a state tracking system of a status change from active to inactive or idle in response to receiving a sentinel as a processing task. In some embodiments, generating a sentinel comprises generating a sentinel symbol, a first temporal identifier, and recording the symbol and temporal identifier in a text string. In some embodiments, the sentinel symbol is a text string in itself. In some embodiments, a process decrements a number of active processes in a given process layer in response to receiving a sentinel. If the number of active processes is zero, the sentinel may pass to a destination queue. In some embodiments, if the number of active processes is not zero, the sentinel is replaced in the source queue. By doing so, a sentinel may pass through only when all processes in a layer have been shut down, allowing for a local, deterministic method of notifying processes to shut down in order. The system may then optimize use of system resources and have improved control over when to implement any clean-up or termination tasks as soon as a given process is ready to terminate. In some embodiments, tasks that are carried out upon termination may comprise releasing memory associated with memory addresses assigned to processes. In some embodiments, tasks carried out upon termination may comprise writing process results to an output file. In some embodiments, tasks carried out upon termination may comprise executing a plurality of clean-up processes. Compared to conventional distributed multiple-producer, multiple-consumer systems, the system is able to communicate global information to all layers in the system successively, such as the presence of a stopping condition, without the need for a global storehouse of information. Thus, a sentinel allows for the system to wind down tasks and more efficiently carry out clean-up processes, even if tasks and processes are distributed across various devices non-locally.

The system may comprise a value for the number of active processes. As referred to herein, a "number of active processes" may comprise an integer value that represents the number of processes that are actively working on processing a processing task concurrently in a given process layer. Thus, the number of active processes may be local to a given process layer, rather than global. In some embodiments, a state tracking system may comprise a value corresponding to the number of active processes. In some embodiments, a number of active processes may refer to a number of active speech-to-text analyzers currently transcribing call-center audio files. Tracking the number of active processes allows a system to locally shut down processes until all processes are terminated within a process layer, before allowing the sentinel to pass through to the rest of the system. Including a number of active processes for a process layer allows a distributed, multiple-producer, multiple-consumer system to determine when a process layer is ready to shut down, and is thus a way to propagate information about the stopping condition from one layer to the next without relying on a central storehouse of information about how many producers and consumers exist in each layer of the system.

The system may comprise a state tracking system. As referred to herein, a "state-tracking system" may comprise an information store for a given process layer about the status of processes within the layer. In some embodiments, a state tracking system may comprise a value for the number of active processes, a first list of active processes within the process layer and respective elapsed processing times and a current temporal identifier. In some embodiments, the respective elapsed processing times may be calculated from how long a process has been processing a particular task. In some embodiments, the state tracking system may comprise a second list of active processes and respective estimated completion times, wherein estimated completion times may refer to a time at which a process in the process layer is expected to complete its processing. By storing and providing information about when a given process layer may finish, or when it started processing, the system may improve its handling and control of system resources and may, for instance, leverage this extra information to predict the time at which processes, threads or tasks may require more resources.

The system may comprise a current temporal identifier. As referred to herein, a "current temporal identifier" may be a marker of the current time. The current temporal identifier may be determined by receiving a system clock setting, wherein a system clock setting comprises a standardized setting for recording a temporal identifier across the network. By including a temporal identifier in the state tracking system, the system is given temporal information about processes, which enables calculations of how long processes have been running and when they might finish. This temporal identifier then allows the system to better predict and manage system resource use throughout the system.

Figure 3:
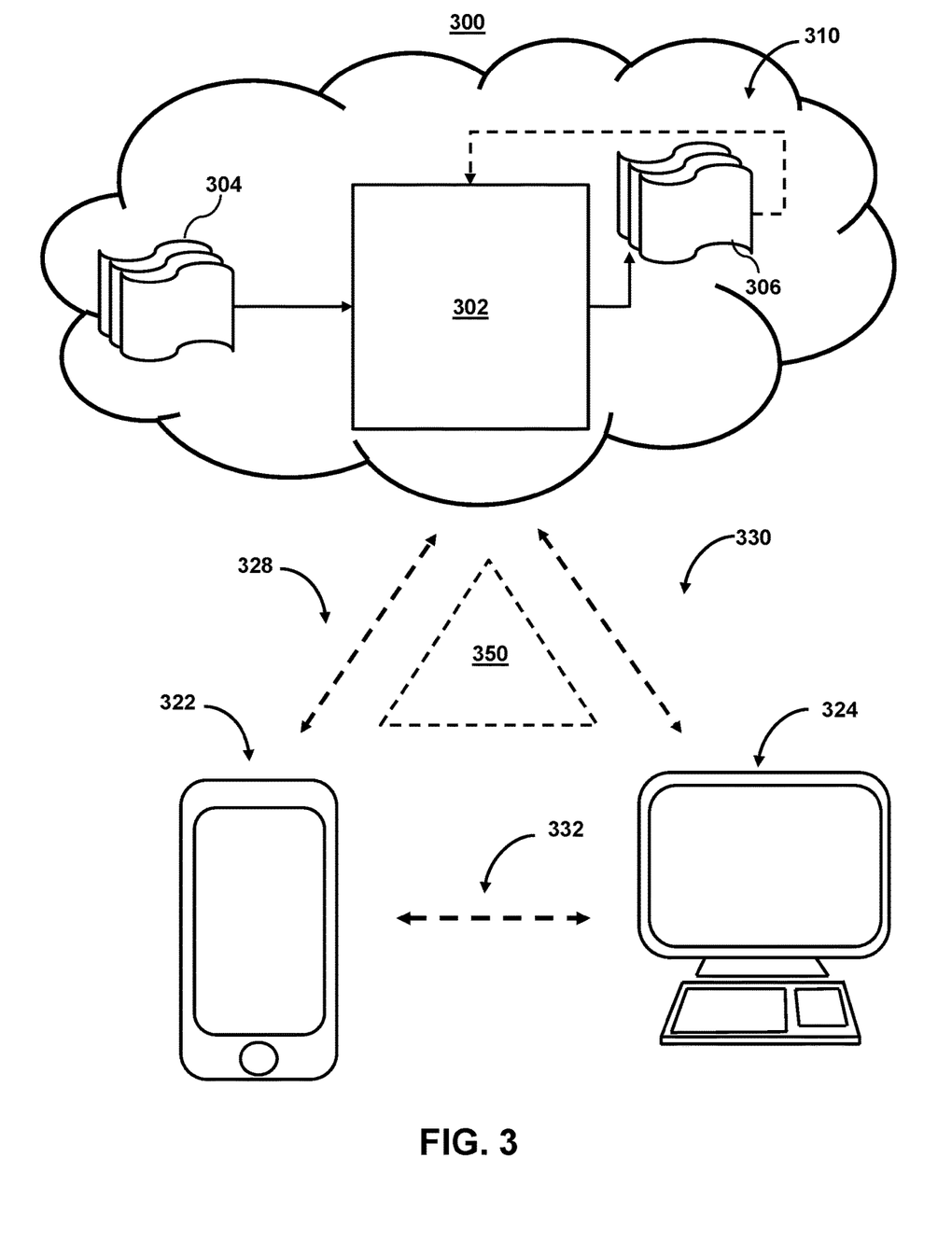
FIG. 3 shows illustrative components for a distributed system that allows for processing tasks on multiple devices, in accordance with one or more embodiments.

FIG. 3 shows illustrative components for a distributed system that allows for processing tasks on multiple devices, in accordance with one or more embodiments. For example, FIG. 3 may show illustrative components for storing, processing and displaying call-center audio transcripts that have been analyzed in a named-entity recognition engine. As shown in FIG. 3, system 300 may include mobile device 322 and user terminal 324. It should be noted that while shown as a smartphone and personal computer, respectively, in FIG. 3, mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324 and cloud components 310, each of these devices may receive content and data via input/output (I/O) paths. Each of these devices may also include processors and/or control circuitry to send and receive commands, requests and other suitable data using the I/O paths. The control circuitry may comprise any suitable processing, storage and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or long term evolution network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include a source queue 202, wherein source queue 202 may comprise various processing tasks 230-236 and may comprise sentinel 228. Cloud components 310 may also include a process layer, for example process layer 204, wherein process layer 204 may contain various processes, for example processes 210-214. Cloud components 310 may, for example, also comprise a destination queue 206. In some embodiments, cloud components 310 may comprise further layers, or a named-entity recognition system 208. In some embodiments, cloud components 310 may comprise a process layer 204, wherein the process layer comprises a state tracking system and a value that represents the number of active processes in the process layer.

Cloud components 310 may access any data regarding features that are enabled in the system. Cloud components 310 may additionally or alternatively access information regarding system throughput, power consumption, system clock settings or memory usage throughout the system or within components of the system. All of the aforementioned data may also be provided as a function of time, in some cases asynchronously. Cloud components 310 may also access data that may require processing; for example, cloud components 310 may access processing task requests, as well as any data that may be required for processing these tasks. For example, cloud components 310 may have access to cloud storage that contains audio files for call-center calls to be transcribed and analyzed.

Cloud components 310 may include model 302, which may be a machine learning model, artificial intelligence model, etc. (which may be referred to collectively herein as "models"). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., convert and transcribe spoken words from an audio file to a text transcript, or deduce a caller's name and telephone information from an audio call).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302.

In some embodiments, the model (e.g., model 302) may automatically perform actions based on outputs 306. In some embodiments, the model (e.g., model 302) may not perform any actions. The output of the model (e.g., model 302) may be used to transcribe audio files and deduce names of entities relating to the caller.

System 300 also includes API layer 350. API layer 350 may allow the system to generate summaries across different devices. In some embodiments, API layer 350 may be implemented on user device 322 or user terminal 324. Alternatively, or additionally, API layer 350 may reside on one or more of cloud components 310. API layer 350 (which may be a representational state transferor Web services API layer) may provide a decoupled interface to data and/or functionality of one or more applications. API layer 350 may provide a common, language-agnostic way of interacting with an application. Web services APIs offer a well-defined contract, called web services description language (WSDL), that describes the services in terms of its operations and the data types used to exchange information. REST APIs do not typically have this contract; instead, they are documented with client libraries for most common languages, including Ruby, Java, PHP, and JavaScript. Simple Object Access Protocol (SOAP) web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols, such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying web application firewall (WAF) and distributed denial-of-service (DDoS) protection, and API layer 350 may use RESTful APIs as standard for external integration.

Figure 4:
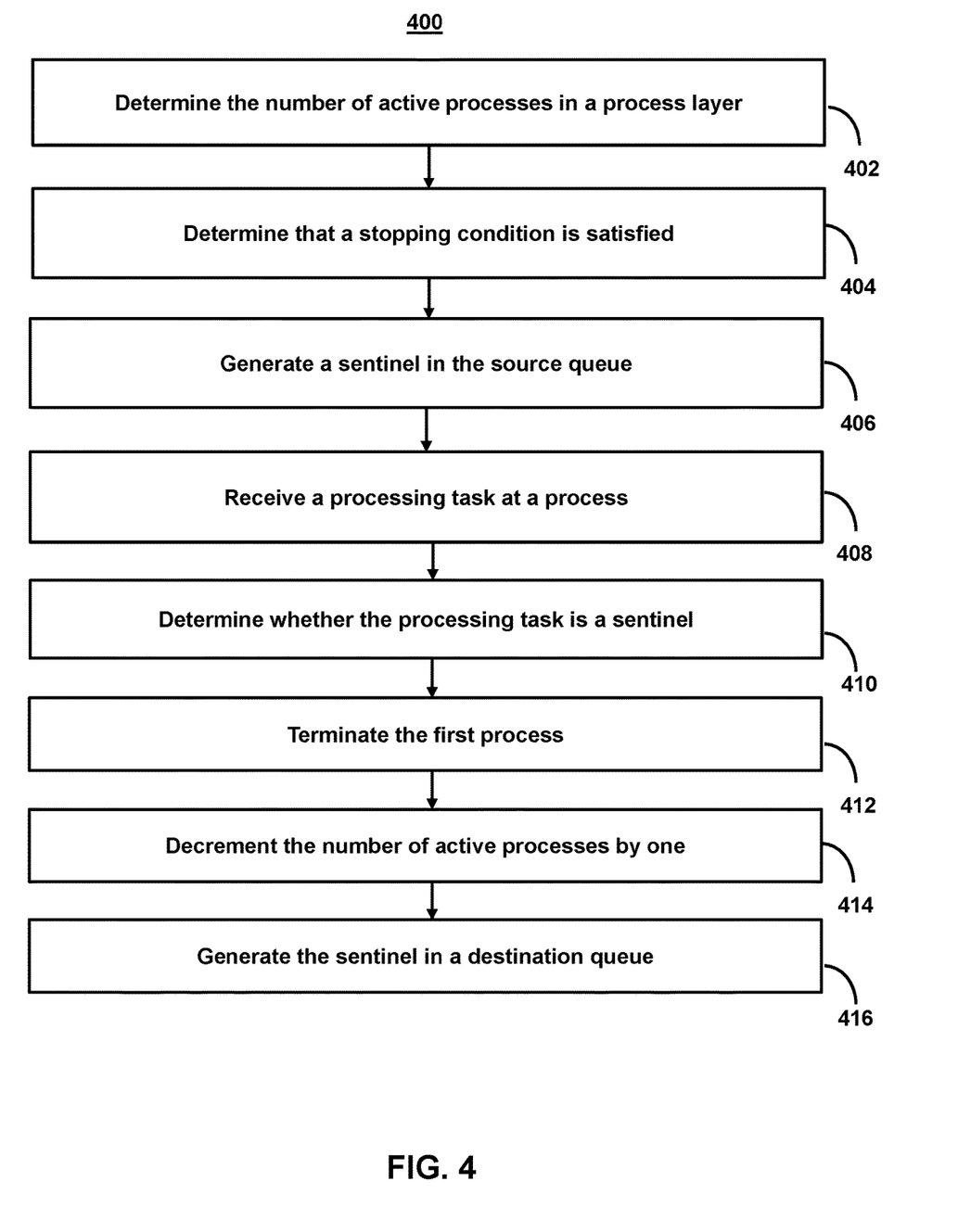
FIG. 4 shows a flowchart of the steps involved in generating and propagating a sentinel in response to a stopping condition, in accordance with one or more embodiments.

FIG. 4 shows a flowchart of the steps involved in generating and propagating a sentinel in response to a stopping condition, in accordance with one or more embodiments. For example, the system may use process 400 (e.g., as implemented on one or more system components described above) in order to notify processes of a lack of further speech-to-text tasks to complete for audio file data, and that the processes may begin to terminate, even in a decentralized, distributed, multiple-producer, multiple-consumer system.

At step 402 (e.g., using one or more components described above), process 400 determines the number of active processes in a process layer. For example, the system may determine a first number of active processes in a first process layer, wherein the first process layer comprises a first plurality of processes. In some embodiments, the first plurality of processes may comprise speech-to-text analyzers. For instance, the system may determine the number of speech-to-text analyzers and respective processes that are actively working on transcribing audio files. By doing so, the system may determine whether any processes that are ongoing are eligible to begin a termination process, which would allow processes to shut down as soon as they are able. Additionally, this step allows the system to determine whether any sentinel passing through the process layer may be passed on to subsequent processing steps to signal their termination as well, in the case that all processes are already inactive. Thus, the system may dedicate system resources to only those processes that are required to run at a given time, allowing for an improvement of efficiency.

In some embodiments, the first process layer may further comprise a state tracking system, which in turn contains the first number of active processes, as well as a temporal identifier and a list of active processes and elapsed processing times. For instance, the first process layer may further comprise a state tracking system, wherein the state tracking system comprises the first number of active processes, a current temporal identifier, and a first list of active processes and respective elapsed processing times, wherein calculating an elapsed processing time for a first active process in the first list of active processes comprises receiving a first current temporal identifier for a first time, receiving a first prior temporal identifier, wherein the first prior temporal identifier corresponds to a second time at which the first active process began, calculating a difference between the first current temporal identifier and the first prior temporal identifier, and recording the difference between the first current temporal identifier and the first prior temporal identifier as the elapsed processing time for the first active process. The inclusion of both current temporal identifier information, as well as prior temporal information from the start of a process allows the system to calculate how long a process has been executing, which may give the system temporal information about system resource usage. For example, the process may be able to determine how long a speech-to-text analyzer has been processing a task, which provides clues as to the complexity of a particular task. The state tracking system can then help with system analytics and optimization within a given process layer.

In some embodiments, the state tracking system may further comprise another list of active processes along with their respective estimated completion time. For instance, the system's state tracking system may further comprise a second list of active processes and respective estimated completion times, wherein recording an estimated completion time for a second active process in the second list of active processes comprises receiving a process completion fraction, wherein the process completion fraction represents a fraction of the second active process that has completed before the first current temporal identifier; calculating a time to completion, wherein calculating the time to completion comprises dividing the elapsed processing time for the second active process by the process completion fraction; and calculating the estimated completion time for the second active process, wherein calculating the estimated completion time for the second active process comprises adding the time to completion to the first prior temporal identifier. For example, the system may calculate an estimated time that a particular speech-to-text analysis process in the particular process layer will complete. By doing so, the system may predict system resource usage in the layer; this information of when a process may complete allows the system to prepare and manage shutting down tasks in advance, which aids in making process termination more efficient.

At step 404 (e.g., using one or more components described above), process 400 determines that a stopping condition is satisfied. For instance, the system may determine that a first stopping condition is satisfied in a first source queue of a first plurality of processing tasks for a first device in a computer network, wherein the first source queue provides the first plurality of processing tasks to the first process layer for the first device. Determining a stopping condition may, in some cases, be a global decision throughout the system that, for example, no further processing tasks are expected. By determining a stopping condition, the system is set up to begin to shut down processes where needed; local processes in process layers may then, in turn, shut off.

In some embodiments, the processing tasks may be audio transcript paths. For instance, the first plurality of processing tasks may comprise audio transcript paths, wherein the first source queue may provide the first plurality of processing tasks to the first process layer for the first device, wherein the first source queue may receive audio transcript processing requests from a first source, and wherein determining that the first stopping condition is satisfied comprises determining that the first source does not contain audio transcript processing requests. That is, the system may determine that there are no further audio transcript processing requests to handle, satisfying the stopping condition.

At step 406 (e.g., using one or more components described above), process 400 generates a sentinel in the source queue. For example, the system may, in response to determining that the first stopping condition is satisfied, generate a first sentinel in the first source queue. For instance, if it is determined that there are no further audio transcript processing requests to handle, the system may generate a sentinel in the first source queue, to subsequently propagate through the system in order to alert components of the ability to begin terminating processes. By doing so, the sentinel allows the system to subsequently notify components of the system that they may begin to terminate. In some embodiments, the first sentinel may be a text file comprising a text string and a temporal identifier. For example, generating the first sentinel in the first source queue comprises generating a first text file at a first time, wherein the first text file comprises a first string, and wherein generating the first string comprises generating a sentinel symbol, receiving a first temporal identifier for the first time, and recording the sentinel symbol and the first temporal identifier at the first time in the first string. The sentinel symbol then acts as a marker in the system that signals, for example, a speech-to-text process that it may begin to terminate and clean-up. By including a timestamp, in the form of a temporal identifier, the components of the system may be given metadata information about the stop request, which may be used for auditing and documentation purposes.

At step 408 (e.g., using one or more components described above), process 400 receives a processing task at a process. For instance, the system may receive, at a first process of the first plurality of processes, a first processing task of the first plurality of processing tasks form the first source queue. For instance, a speech-to-text analyzer may receive either an audio file to transcribe or a sentinel, signaling that it may begin to terminate. The audio file to transcribe may be of differing size, length, or complexity, which may alter the time for which the process is active. By allowing the analyzer, or any process, to receive either a processing task or a sentinel, the analyzer is predisposed to receive information about terminating directly from the source queue, which is a mechanism by which it may be notified without relying on a central storehouse of information.

At step 410 (e.g., using one or more components described above), process 400 may determine whether the processing task is a sentinel. For instance, the system determines whether first processing task comprises the first sentinel. For example, the process may either receive, for example, a speech-to-text analyzer processing task such as an audio file, or it may receive a sentinel, comprising a symbol and a temporal identifier, in some embodiments. By allowing for differentiating between a task and a sentinel, which acts as a stop request, the process may be notified that it may begin to terminate based on an external command to stop. Again, this mechanism allows for notifications without relying on a central storehouse of information, which enables a distributed multiple-producer, multiple-consumer system without sacrificing top-down communication.

At step 412 (e.g., using one or more components described above), process 400 may, in response to determining that the first process received a sentinel, terminate the process. For instance, in response to determining that the first processing task comprises the first sentinel, the system may terminate the first process. For example, if the speech-to-text process detects that it received a sentinel, it may begin to finish executing any tasks, process any outputs and write the model output to a model file. The system may terminate the first process, wherein terminating the first process comprises finishing an execution of speech-to-text model tasks, processing a speech-to-text model output, and writing the speech-to-text model output to a model output file. By doing so, the process, which may be a speech-to-text analyzer process in some embodiments, may react to the notification that there is no further work, for instance. Again, this mechanism allows for actions to be taken without relying on a central, global controller, which enables a distributed multiple-producer, multiple-consumer system without sacrificing top-down control.

In some embodiments, terminating the first process may include determining a result and writing it to an output file. For instance, terminating the first process may comprise determining a first process result, and writing the first process result to a first output file. In the case of the speech-to-text engine, for example, a speech-to-text analyzer may, in response to receiving instructions to terminate, determine the transcription of the audio file and write these to an output file, which may be placed in cloud storage or another accessible medium. By writing results to an output file, the process is leveraging the notification by the sentinel that it must terminate to finish any processes that must be carried out and summarize results as soon as it receives said notification. Thus, the results may be written and accessible sooner than if no notification were received, allowing for improved efficiency of any products of the processes.

In some embodiments, terminating the first process may include determining memory addresses where the process stores memory and releasing it. For instance, terminating the first process may comprise determining an array of memory addresses, wherein the array of memory addresses comprises information about memory addresses used by the first process, and wherein a memory address points to a memory, and releasing the memory associated with the memory addresses in the array of memory addresses. For example, if a speech-to-text analyzer uses a set of memory addresses in order to conduct its execution, the system may release the memory associated with these memory addresses upon notification by the sentinel. By doing so, the system may be allowed to redistribute system resources to other processes that may need this memory, for example, which improves efficiency and control over the system as a whole.

In some embodiments, terminating the first process may require the execution of other clean-up processes. For instance, terminating the first process may comprise determining a plurality of clean-up processes, wherein the plurality of clean-up processes is required to terminate the first process, and executing the plurality of clean-up processes. For example, in order to terminate the speech-to-text analyzer, the system may need to execute a task to release memory, communicate results of the process to another device, and untrain any models that were trained in the process of analyzing the audio files' speech. Thus, the mechanism may give the process the opportunity to carry out any additional tasks that are required for this termination.

At step 414 (e.g., using one or more components described above), process 400 decrements the number of active processes by one. For instance, in response to determining that the first processing task comprises the first sentinel, the system decrements the first number of active processes by one. For example, if there are multiple speech-to-text analyzer systems that are actively processing audio data, upon terminating one of these processes, the system may decrement the number of active processes by one to signal that there is one fewer process in the process layer that is active. By doing so, the system is alerted as to whether the whole process layer has been terminated yet and, therefore, whether the sentinel is ready to be passed onto the next layer, which enables the sentinel to fully propagate through all layers and, as a result, notify all relevant processes. Thus, even without a top-down, centralized view of the system, all relevant processes are still able to be notified.

At step 416 (e.g., using one or more components described above), process 400 may generate the sentinel in a destination queue. For instance, in response to determining that the first number of active processes in the first process layer is zero, the system may generate the first sentinel in a first destination queue. For example, if all other speech-to-text processes in a process layer were shut down, the process layer is then ready to pass the sentinel to the next stage of the workflow, in this case a destination queue. By doing so, the system ensures that it does not miss any processes before propagating the sentinel onwards; it also enables notification of multiple layers, as the sentinel is passed onto any next steps that the system may have, where it may continue notifying other components. Importantly, this ensures that the stopping condition is only propagated to the next layer when all processing tasks in the source queue have been completed, while any state tracking system may operate locally on a per-layer basis.

In some embodiments, a process may place a sentinel back on the queue upon being notified of the stopping condition. For instance, in response to determining that the first processing task comprises the first sentinel, the system may replace the first sentinel into the first source queue. This mechanism ensures that the sentinel may continue to notify any other processes within the process layer that they may need to be terminated. Thus, by placing the sentinel back on the queue, the system may ensure that the sentinel passes through every process. By doing so, this ensures that the stopping condition only passes onwards when all processing tasks have been terminated and all processes have been terminated as well.

In some embodiments, the system may generate a second set of processing tasks in the destination queue, determine a second number of active processes in a second process layer, receive a second processing task at a second process, determine whether the second processing task comprises a sentinel, terminate the second process, decrement the second number of active processes by one, and generate the first sentinel in a second destination queue. For example, the system may generate a second plurality of processing tasks in the first destination queue, determine a second number of active processes in a second process layer for a second device, wherein the second process layer comprises a second plurality of processes, and wherein the first destination queue provides the second plurality of processing tasks to the second process layer, receive at a second process of the second plurality of processes, a second processing task of the second plurality of processing tasks from the first destination queue, determine whether the second processing task comprises the first sentinel, in response to determining that the second processing task comprises the first sentinel, terminate the second process and decrement the second number of active processes by one, and, in response to determining that the second number of active processes in the second process is zero, generate the first sentinel in a second destination queue. For example, a speech-to-text process layer may pass on processing task results or a sentinel to its own destination queue, which may in turn act as a source queue for another layer of processes (one that, for example, carries out named-entity recognition). By doing so, the system may pass information and a sentinel onto additional layers. This architecture allows for both notification of a stopping condition, as well as processed data, to flow into subsequent stages of the system, without relying on a central storehouse of information to control this communication. Thus, this feature allows the system to act in a distributed, multiple-producer, multiple-consumer model, which may in fact have multiple layers distributed across multiple platforms, devices or subsystems.

In some embodiments, the system may, upon finding a second processing task at the first source queue, determine the location of the sentinel and remove it from the source queue. For example, the system may receive, at the first source queue, a second processing task, determine a location of the first sentinel in the first source queue, and, in response to determining the location of the first sentinel in the first source queue, remove the first sentinel from the first source queue. For instance, if, after the system had already determined that there are no further audio files to analyze in a speech-to-text analyzer, it finds another audio file to analyze, this feature ensures that the sentinel placed by the earlier stopping condition is removed, as the earlier stopping condition is no longer valid. This feature ensures that, in the event of a change in the stopping conditions, the sentinel may be recalled before causing any processes to erroneously terminate early. This mechanism improves the durability and adaptability of the system to new conditions that may arise after the generation of a first sentinel.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for propagating stopping conditions in a distributed, multiple-producer, multiple-consumer system, the method comprising determining a first number of active processes in a first process layer, wherein the first process layer comprises a first plurality of processes; determining that a first stopping condition is satisfied in a first source queue of a first plurality of processing tasks for a first device in a computer network, wherein the first source queue provides the first plurality of processing tasks to the first process layer for the first device; in response to determining that the first stopping condition is satisfied, generating a first sentinel in the first source queue; receiving, at a first process of the first plurality of processes, a first processing task of the first plurality of processing tasks from the first source queue, determining whether the first processing task comprises the first sentinel; in response to determining that the first processing task comprises the first sentinel, terminating the first process and decrementing the first number of active processes by one; and, in response to determining that the first number of active processes in the first process layer is zero, generating the first sentinel in a first destination queue.
2. The method of the preceding embodiment, further comprising, in response to determining that the first processing task comprises the first sentinel, replacing the first sentinel into the first source queue.
3. The method of any one of the preceding embodiments, further comprising generating a second plurality of processing tasks in the first destination queue; determining a second number of active processes in a second process layer for a second device, wherein the second process layer comprises a second plurality of processes, and wherein the first destination queue provides the second plurality of processing tasks to the second process layer; receiving, at a second process of the second plurality of processes, a second processing task of the second plurality of processing tasks from the first destination queue, determining whether the second processing task comprises the first sentinel; in response to determining that the second processing task comprises the first sentinel, terminating the second process and decrementing the second number of active processes by one; and, in response to determining that the second number of active processes in the second process layer is zero, generating the first sentinel in a second destination queue.
4. The method of any one of the preceding embodiments, wherein terminating the first process comprises determining a first process result and writing the first process result to a first output file.
5. The method of any one of the preceding embodiments, wherein terminating the first process comprises determining an array of memory addresses, wherein the array of memory addresses comprises information about memory addresses used by the first process, and wherein a memory address points to a memory, and releasing the memory associated with the memory addresses in the array of memory addresses.
6. The method of any one of the preceding embodiments, wherein terminating the first process comprises determining a plurality of clean-up processes, wherein the plurality of clean-up processes is required to terminate the first process and executing the plurality of clean-up processes.
7. The method of any one of the preceding embodiments, wherein generating the first sentinel in the first source queue comprises generating a sentinel symbol, receiving a first temporal identifier for the first time, and recording the sentinel symbol and the first temporal identifier at the first time in the first string.
8. The method of any one of the preceding embodiments, further comprising receiving, at the first source queue, a second processing task, determining a location of the first sentinel in the first source queue, and, in response to determining the location of the first sentinel in the first source queue, removing the first sentinel from the first source queue.
9. The method of any one of the preceding embodiments, wherein the first process layer further comprises a state tracking system, wherein the state tracking system comprises the first number of active processes, a current temporal identifier, and a first list of active processes and respective elapsed processing times, wherein calculating an elapsed processing time for a first active process in the first list of active processes comprises receiving a first current temporal identifier for a first time, receiving a first prior temporal identifier, wherein the first prior temporal identifier corresponds to a second time at which the first active process began, calculating a difference between the first current temporal identifier and the first prior temporal identifier, and recording the difference between the first current temporal identifier and the first prior temporal identifier as the elapsed processing time for the first active process.
10. The method of any one of the preceding embodiments, wherein the state tracking system further comprises a second list of active processes and respective estimated completion times, wherein recording an estimated completion time for a second active process in the second list of active processes comprises receiving a process completion fraction, wherein the process completion fraction represents a percentage fraction of the second active process that has been completed before the first current temporal identifier, calculating a time to completion, wherein calculating the time to completion comprises dividing the elapsed processing time for the second active process by the process completion fraction and calculating the estimated completion time for the second active process, wherein calculating the estimated completion time for the second active process comprises adding the time to completion to the first prior temporal identifier.
11. A tangible, non-transitory, machine-readable medium storing instructions that, when executed by a data processing apparatus, cause the data processing apparatus to perform operations comprising those of any of embodiments 1-10.
12. A system comprising one or more processors and memory storing instructions that, when executed by the processors, cause the processors to effectuate operations comprising those of embodiments 1-10.
13. A system comprising means for performing any of embodiments 1-10.

What is claimed is:

1. A system for propagating stopping conditions in a distributed, multiple-producer, multiple-consumer system intended for speech-to-text processing in a named-entity recognition engine, the system comprising:
   determining a first number of active processes in a first process layer, wherein the first process layer comprises a first plurality of processes, and wherein the first plurality of processes comprises speech-to-text analyzers;
   determining that a first stopping condition is satisfied in a first source queue of a first plurality of processing tasks for a first device in a computer network, wherein the first plurality of processing tasks comprises audio transcript paths, wherein the first source queue provides the first plurality of processing tasks to the first process layer for the first device, wherein the first source queue receives audio transcript processing requests from a first source;
   in response to determining that the first stopping condition is satisfied, generating a first sentinel in the first source queue, wherein the first sentinel is a text file comprising a text string and a temporal identifier;
   receiving, at a first process of the first plurality of processes, a first processing task of the first plurality of processing tasks from the first source queue;
   determining whether the first processing task comprises the first sentinel;
   in response to determining that the first processing task comprises the first sentinel:
      terminating the first process, wherein terminating the first process comprises finishing an execution of speech-to-text model tasks, processing a speech-to-text model output and writing the speech-to-text model output to a model output file; and
      decrementing the first number of active processes by one; and
      in response to determining that the first number of active processes in the first process layer is zero, generating the first sentinel in a first destination queue, wherein the first destination queue provides named-entity processing tasks to a named-entity recognition system.

2. A method for propagating stopping conditions in a distributed, multiple-producer, multiple-consumer system, the method comprising:
   determining a first number of active processes in a first process layer, wherein the first process layer comprises a first plurality of processes, and wherein the first plurality of processes comprises speech-to-text analyzers;
   determining that a first stopping condition is satisfied in a first source queue of a first plurality of processing tasks for a first device in a computer network, wherein the first plurality of processing tasks comprises audio transcript paths, wherein the first source queue provides the first plurality of processing tasks to the first process layer for the first device, wherein the first source queue receives audio transcript processing requests from a first source;
   in response to determining that the first stopping condition is satisfied, generating a first sentinel in the first source queue, wherein the first sentinel is a text file comprising a text string;
   receiving, at a first process of the first plurality of processes, a first processing task of the first plurality of processing tasks from the first source queue;
   determining whether the first processing task comprises the first sentinel;
   in response to determining that the first processing task comprises the first sentinel:
      terminating the first process, wherein terminating the first process comprises finishing an execution of a set of a speech-to-text model tasks, processing a speech-to-text model output and writing the speech-to-text model output to a model output file; and
      decrementing the first number of active processes by one; and
   in response to determining that the first number of active processes in the first process layer is zero, generating the first sentinel in a first destination queue, wherein the first destination queue provides named-entity processing tasks to a named-entity recognition system.

3. The method of claim 2, further comprising, in response to determining that the first processing task comprises the first sentinel, replacing the first sentinel into the first source queue.

4. The method of claim 2, further comprising:
   generating a second plurality of processing tasks in the first destination queue;
   determining a second number of active processes in a second process layer for a second device, wherein the second process layer comprises a second plurality of processes, and wherein the first destination queue provides the second plurality of processing tasks to the second process layer;
   receiving, at a second process of the second plurality of processes, a second processing task of the second plurality of processing tasks from the first destination queue;
   determining whether the second processing task comprises the first sentinel;
   in response to determining that the second processing task comprises the first sentinel:
      terminating the second process; and
      decrementing the second number of active processes by one; and
   in response to determining that the second number of active processes in the second process layer is zero, generating the first sentinel in a second destination queue.

5. The method of claim 2, wherein terminating the first process comprises:
   determining a first process result; and
   writing the first process result to a first output file.

6. The method of claim 2, wherein terminating the first process comprises:
   determining an array of memory addresses, wherein the array of memory addresses comprises information about memory addresses used by the first process, and wherein a memory address points to a memory; and
   releasing the memory associated with the memory addresses in the array of memory addresses.

7. The method of claim 2, wherein terminating the first process comprises:
   determining a plurality of clean-up processes, wherein the plurality of clean-up processes is required to terminate the first process; and
   executing the plurality of clean-up processes.

8. The method of claim 2, wherein the text file is a first text file, and wherein generating the first sentinel in the first source queue comprises:

generating the first text file at a first time, wherein the first text file comprises a first string, and wherein generating the first string comprises:
   generating a sentinel symbol;
   receiving a first temporal identifier for the first time; and
   recording the sentinel symbol and the first temporal identifier at the first time in the first string.

9. The method of claim 2, further comprising:
   receiving, at the first source queue, a second processing task;
   determining a location of the first sentinel in the first source queue; and
   in response to determining the location of the first sentinel in the first source queue, removing the first sentinel from the first source queue.

10. The method of claim 2, wherein the first process layer further comprises a state tracking system, wherein the state tracking system comprises the first number of active processes, a current temporal identifier, and a first list of active processes and respective elapsed processing times, wherein calculating an elapsed processing time for a first active process in the first list of active processes comprises:
   receiving a first current temporal identifier for a first time;
   receiving a first prior temporal identifier, wherein the first prior temporal identifier corresponds to a second time at which the first active process began;
   calculating a difference between the first current temporal identifier and the first prior temporal identifier; and
   recording the difference between the first current temporal identifier and the first prior temporal identifier as the elapsed processing time for the first active process.

11. The method of claim 10, wherein the state tracking system further comprises a second list of active processes and respective estimated completion times, wherein recording an estimated completion time for a second active process in the second list of active processes comprises:
   receiving a process completion fraction, wherein the process completion fraction represents a fraction of the second active process that has been completed before the first current temporal identifier;
   calculating a time to completion, wherein calculating the time to completion comprises dividing the elapsed processing time for the second active process by the process completion fraction; and
   calculating the estimated completion time for the second active process, wherein calculating the estimated completion time for the second active process comprises adding the time to completion to the first prior temporal identifier.

12. A non-transitory, computer-readable medium comprising instructions that, when executed on one or more processors, causes operations comprising:
   determining a first number of active processes in a first process layer, wherein the first process layer comprises a first plurality of processes, and wherein the first plurality of processes comprises speech-to-text analyzers;
   determining that a first stopping condition is satisfied in a first source queue of a first plurality of processing tasks for a first device in a computer network, wherein the first plurality of processing tasks comprises audio transcript paths, wherein the first source queue provides the first plurality of processing tasks to the first process layer for the first device, wherein the first source queue receives audio transcript processing requests from a first source;
   in response to determining that the first stopping condition is satisfied, generating a first sentinel in the first source queue, wherein the first sentinel is a text file comprising a text string;
   receiving, at a first process of the first plurality of processes, a first processing task of the first plurality of processing tasks from the first source queue;
   determining whether the first processing task comprises the first sentinel;
   in response to determining that the first processing task comprises the first sentinel:
      terminating the first process, wherein terminating the first process comprises finishing an execution of a set of speech-to-text model tasks, processing a speech-to-text text model output and writing the speech-to-text model output to a model output file; and
      decrementing the first number of active processes by one; and
   in response to determining that the first number of active processes in the first process layer is zero, generating the first sentinel in a first destination queue, wherein the first destination queue provides named-entity processing tasks to a named-entity recognition system.

13. The non-transitory, computer-readable medium of claim 12, wherein the instructions further cause operations comprising, in response to determining that the first processing task comprises the first sentinel, replacing the first sentinel into the first source queue.

14. The non-transitory, computer-readable medium of claim 12, wherein the instructions further cause operations comprising:
   generating a second plurality of processing tasks in the first destination queue;
   determining a second number of active processes in a second process layer for a second device, wherein the second process layer comprises a second plurality of processes, and wherein the first destination queue provides the second plurality of processing tasks to the second process layer;
   receiving, at a second process of the second plurality of processes, a second processing task of the second plurality of processing tasks from the first destination queue;
   determining whether the second processing task comprises the first sentinel;
   in response to determining that the second processing task comprises the first sentinel:
      terminating the second process; and
      decrementing the second number of active processes by one; and
   in response to determining that the second number of active processes in the second process layer is zero, generating the first sentinel in a second destination queue.

15. The non-transitory, computer-readable medium of claim 12, wherein terminating the first process comprises:
   determining a first process result; and
   writing the first process result to a first output file.

16. The non-transitory, computer-readable medium of claim 12, wherein terminating the first process comprises:
   determining an array of memory addresses, wherein the array of memory addresses comprises information about memory addresses used by the first process, and wherein a memory address points to a memory; and
   releasing the memory associated with the memory addresses in the array of memory addresses.

17. The non-transitory, computer-readable medium of claim 12, wherein terminating the first process comprises:
   determining a plurality of clean-up processes, wherein the plurality of clean-up processes is required to terminate the first process; and
   executing the plurality of clean-up processes.

18. The non-transitory, computer-readable medium of claim 12, wherein the text file a first text file, and wherein generating the first sentinel in the first source queue comprises:
   generating the first text file at a first time, wherein the first text file comprises a first string, and wherein generating the first string comprises:
      generating a sentinel symbol;
      receiving a first temporal identifier for the first time; and
      recording the sentinel symbol and the first temporal identifier at the first time in the first string.

19. The non-transitory, computer-readable medium of claim 12, wherein the instructions further cause operations comprising:
   receiving, at the first source queue, a second processing task;
   determining a location of the first sentinel in the first source queue; and
   in response to determining the location of the first sentinel in the first source queue, removing the first sentinel from the first source queue.

20. The non-transitory, computer-readable medium of claim 12, wherein the first process layer further comprises a state tracking system, wherein the state tracking system comprises the first number of active processes, a current temporal identifier, and a list of active processes and respective elapsed processing times, wherein calculating an elapsed processing time for an active process in the list of active processes comprises:
   receiving a first current temporal identifier for a first time;
   receiving a first prior temporal identifier, wherein the first prior temporal identifier corresponds to a second time at which the active process began;
   calculating a difference between the first current temporal identifier and the first prior temporal identifier; and
   recording the difference between the first current temporal identifier and the first prior temporal identifier as the elapsed processing time for the active process.

\* \* \* \* \*